US011867134B2

United States Patent
Nakajima et al.

(10) Patent No.: US 11,867,134 B2
(45) Date of Patent: Jan. 9, 2024

(54) INTERNAL-COMBUSTION-ENGINE CONTROL APPARATUS

(71) Applicant: Mitsubishi Electric Corporation, Tokyo (JP)

(72) Inventors: Kenji Nakajima, Tokyo (JP); Takayuki Gamahara, Tokyo (JP); Shinichiro Hidaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/899,965

(22) Filed: Aug. 31, 2022

(65) Prior Publication Data

US 2023/0349340 A1  Nov. 2, 2023

(30) Foreign Application Priority Data

Apr. 28, 2022  (JP) ................. 2022-074179

(51) Int. Cl.
*F02D 41/18* (2006.01)
*F02D 41/26* (2006.01)
*F02D 41/14* (2006.01)

(52) U.S. Cl.
CPC .......... *F02D 41/18* (2013.01); *F02D 41/1401* (2013.01); *F02D 41/26* (2013.01); *F02D 2041/1431* (2013.01); *F02D 2041/1432* (2013.01); *F02D 2200/0414* (2013.01)

(58) Field of Classification Search
CPC ...... F02D 41/1401; F02D 41/18; F02D 41/26; F02D 2041/1431; F02D 2041/1432; F02D 2200/0414
See application file for complete search history.

(56) References Cited

U.S. PATENT DOCUMENTS

2016/0273949 A1  9/2016  Kawai et al.
2021/0302211 A1  9/2021  Yamamoto et al.

FOREIGN PATENT DOCUMENTS

| JP | 2004347505 A | * | 12/2004 |
|----|--------------|---|---------|
| JP | 5933782 B1   |   | 6/2016  |
| JP | 6858929 B2   |   | 4/2021  |

* cited by examiner

Primary Examiner — Phutthiwat Wongwian
Assistant Examiner — Mark L. Greene
(74) Attorney, Agent, or Firm — Sughrue Mion, PLLC; Richard C. Turner

(57) ABSTRACT

The internal-combustion-engine control apparatus has an intake-air-temperature correction control apparatus including a first-order advance compensation means that calculates an advance-compensation amount for an intake-air temperature detection signal, a time constant determination means that calculates a time constant of the first-order advance compensation means, and a first-order delay compensation means that receives a calculation value of the first-order advance compensation means; the time constant determination means includes a time constant setting means that sets a time constant, based on an intake-air flow rate detection signal, an upper-limit-value setting means that sets an upper limit value of the time constant calculated by the time constant determination means, and a minimum value selection means that selects and outputs a minimum value of a time constant set by the time constant setting means and the upper limit value set by the upper-limit-value setting means.

8 Claims, 8 Drawing Sheets

FIG. 9
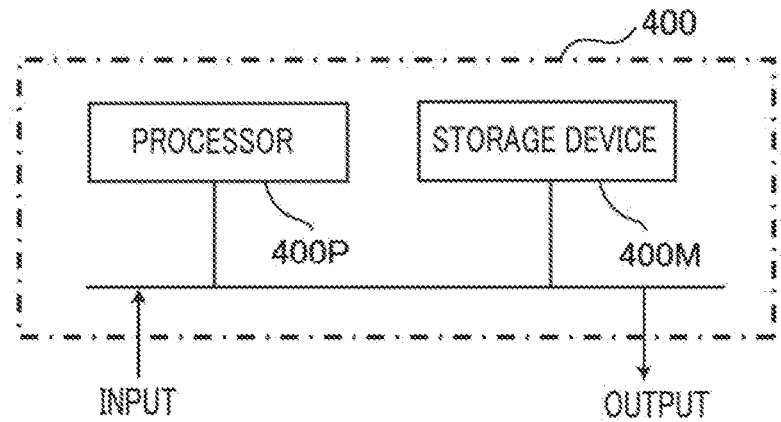
FIG. 10A
Prior Art
POWER SUPPLY TO INTAKE-AIR
PHYSICAL QUANTITY
MEASUREMENT APPARATUS
FIG. 10B
Prior Art
INTAKE-AIR TEMPERATURE
DETECTION SIGNAL FROM INTAKE-AIR
TEMPERATURE DETECTION DEVICE
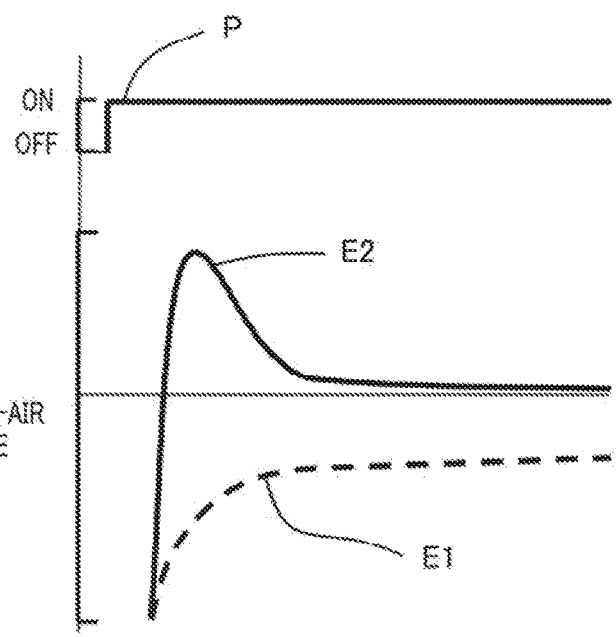

INTERNAL-COMBUSTION-ENGINE CONTROL APPARATUS

BACKGROUND OF THE INVENTION

Field of the Invention

The present disclosure relates to an internal-combustion-engine control apparatus.

Description of the Related Art

In an internal-combustion-engine control apparatus, an intake-air flow rate, which is a physical quantity of intake air (hereinafter, referred to as an intake-air physical quantity) is important information for determining an optimum fuel injection amount. In addition, an intake-air temperature is utilized for correcting fuel injection control and ignition-timing control and is important information for raising the accuracy of internal-combustion-engine control.

To date, it has been known that in an internal-combustion-engine control apparatus is provided with an intake-air physical quantity measurement apparatus that is configured in such a way that an intake-air flow rate detection device for measuring an intake-air flow rate is disposed in a measurement path for introducing part of intake air and in such a way that an intake-air temperature detection device for detecting an intake-air temperature is disposed in the measurement path or in a main path.

In such a conventional intake-air physical quantity measurement apparatus, a semiconductor device formed of a thin film having a thickness in the order of microns is utilized, as an intake-air flow rate detection device, and the intake-air flow rate detection device and an intake-air temperature detection device are arranged on one and the same substrate so as to be integrated with each other, so that downsizing and cost-saving of the intake-air physical quantity measurement apparatus are realized.

In the case of a conventional intake-air physical quantity measurement apparatus in which an intake-air flow rate detection device and an intake-air temperature detection device are arranged on one and the same substrate so as to be integrated with each other, when it is disposed in a measurement path or a circuit containing portion having a large heat capacity, a change in an intake-air temperature detection signal of the intake-air temperature detection device is delayed from a temperature change in the intake air flowing in the main path of an internal-combustion-engine intake system; as a result, there has been a problem that even when the measurement accuracy of the intake-air temperature detection device itself is raised, no intake-air temperature detection signal having a desired accuracy can be obtained.

As a means for solving the foregoing problem, there has been disclosed an intake-air physical quantity measurement apparatus in which the responsiveness thereof is improved by applying the first-order advance compensation to the value of the intake-air temperature detection signal detected by the intake-air temperature detection device (for example, refer to Patent Document 1). However, in the case of the conventional intake-air physical quantity measurement apparatus disclosed in Patent Document 1, there has been a problem that ambient environment, EMC (Electromagnetic Compatibility) noise, or the like causes excessive correction to occur when the intake-air temperature detection signal suddenly changes.

In consideration of the foregoing problem of the conventional intake-air physical quantity measurement apparatus disclosed in Patent Document 1, there has been disclosed an intake-air physical quantity measurement apparatus in which based on the difference between the input and output of the first-order advance compensation, the gain of the first-order advance compensation is changed and in which when an intake-air temperature detection signal to be input suddenly changes, the excessive correction is suppressed by decreasing the correction amount of the first-order advance compensation (for example, refer to Patent Document 2).

PRIOR ART REFERENCE

Patent Document

[Patent Document 1] Japanese Patent No. 5933782
[Patent Document 2] Japanese Patent No. 6858929

SUMMARY OF THE INVENTION

As is well known, in an intake-air physical quantity measurement apparatus to be utilized to measure an intake-air flow rate and an intake-air temperature, an intake-air flow rate detection device is heated up by a heater incorporated in the intake-air physical quantity measurement apparatus so as to be kept at a constant temperature, and the intake-air flow rate is measured by use of the fact that the heater current changes based on the intake-air flow rate and hence the voltage of the intake-air flow rate detection device changes. In addition, because an intake-air temperature detection device measures not only an intake-air temperature but also heat transfer caused through heating by the heater, a contributing factor other than the intake-air temperature causes a temperature change. Accordingly, because in the conventional apparatus disclosed in Patent Document 1, the time constant of the first-order advance compensation becomes inappropriate; thus, there has been a problem that the corrected temperature becomes an excessively corrected one.

In addition, in the conventional apparatus disclosed in Patent Document 2, in order to prevent excessive correction at a time of a sudden signal change from being caused by the effect of ambient environment or EMC noise, the gain of the first-order advance compensation is changed in accordance with the difference between the input and output of the first-order advance compensation; however, because the gain is set in such a way as to prevent excessive correction from being caused due to ambient environment or EMC noise, it has been difficult to suppress excessive correction caused by an temperature increase of the heater incorporated in the intake-air physical quantity measurement apparatus.

Furthermore, in the conventional apparatus disclosed in Patent Document 2, because the gain is changed while providing a hysteresis to the difference between the input and output of the first-order advance compensation, the gain becomes discontinuous when being changed and hence it is required to apply filtering to the changed gain so as to keep the continuity of the output; thus, there has been a problem that the control structure is complicated.

The present disclosure is to disclose a technology for solving the foregoing problems; the objective thereof is to provide an internal-combustion-engine control apparatus that is provided with a simply configured intake-air-temperature correction control apparatus that can suppress excessive correction of an intake-air temperature detection signal.

The foregoing and other object, features, aspects, and advantages of the present invention will become more apparent from the following detailed description of the present invention when taken in conjunction with the accompanying drawings.

An internal-combustion-engine control apparatus disclosed in the present disclosure includes
an intake-air physical quantity measurement apparatus having
an intake-air flow rate detection apparatus that detects a flow rate of intake air to be sucked into an internal combustion engine and then outputs an intake-air flow rate detection signal, and
an intake-air temperature detection apparatus that detects a temperature of the intake air and then outputs an intake-air temperature detection signal, and
an intake-air-temperature correction control apparatus having
a first-order advance compensation means that applies advance compensation to the intake-air temperature detection signal by use of the intake-air temperature detection signal,
a time constant determination means that calculates a time constant for performing the advance compensation and then input the time constant to the first-order advance compensation means, and
a first-order delay compensation means that applies delay compensation to a calculation value of the first-order advance compensation means, and outputting an output of the first-order delay compensation means, as a corrected intake-air temperature detection signal. The internal-combustion-engine control apparatus is characterized
in that the time constant determination means has
a time constant setting means that sets the time constant, based on the intake-air flow rate detection signal,
an upper-limit-value setting means that sets an upper limit value of the time constant, and
a minimum value selection means that selects and outputs a minimum value of a time constant set by the time constant setting means and the upper limit value set by the upper-limit-value setting means, and
in that the first-order advance compensation means applies advance compensation to the intake-air temperature detection signal, based on the output of the minimum value selection means, and controls the internal combustion engine by use of the corrected intake-air temperature detection signal to be outputted from the intake-air-temperature correction control apparatus.

Furthermore, An internal-combustion-engine control apparatus disclosed in the present disclosure includes
an intake-air physical quantity measurement apparatus having
an intake-air flow rate detection apparatus that detects a flow rate of intake air to be sucked into an internal combustion engine and then outputs an intake-air flow rate detection signal, and
an intake-air temperature detection apparatus that detects a temperature of the intake air and then outputs an intake-air temperature detection signal, and
an intake-air-temperature correction control apparatus having
a first-order advance compensation means that applies advance compensation to the intake-air temperature detection signal by use of the intake-air temperature detection signal,
a time constant determination means that calculates a time constant for performing the advance compensation and then input the time constant to the first-order advance compensation means, and
a first-order delay compensation means that applies delay compensation to a calculation value of the first-order advance compensation means, and outputting an output of the first-order delay compensation means, as a corrected intake-air temperature detection signal. The internal-combustion-engine control apparatus is characterized
in that the time constant determination means has
a first time constant setting means that sets a first time constant, based on the intake-air flow rate detection signal,
a second time constant setting means that sets a second time constant, based on the intake-air flow rate detection signal, and
a time constant selection means that selects any one of the first time constant set by the first time constant setting means and the second time constant set by the second time constant setting means, and
in that the first-order advance compensation means applies advance compensation to the intake-air temperature detection signal, based on said any one of said time constants, selected by the time constant selection means, and controls the internal combustion engine by use of the corrected intake-air temperature detection signal to be outputted from the intake-air-temperature correction control apparatus.

The present disclosure makes it possible to obtain an internal-combustion-engine control apparatus having a simply configured intake-air-temperature correction control apparatus that can suppress excessive correction of an intake-air temperature detection signal.

BRIEF DESCRIPTION OF THE DRAWINGS

FIG. 9 is a block diagram representing an example of the hardware configuration of an ECU in the internal-combustion-engine control apparatus according to each of Embodiments 1 and 2; and FIG. 10A and FIG. 10B is an explanatory graph for a conventional apparatus as a comparative example.

DETAILED DESCRIPTION OF THE PREFERRED EMBODIMENTS

Embodiment 1

Figure 1:
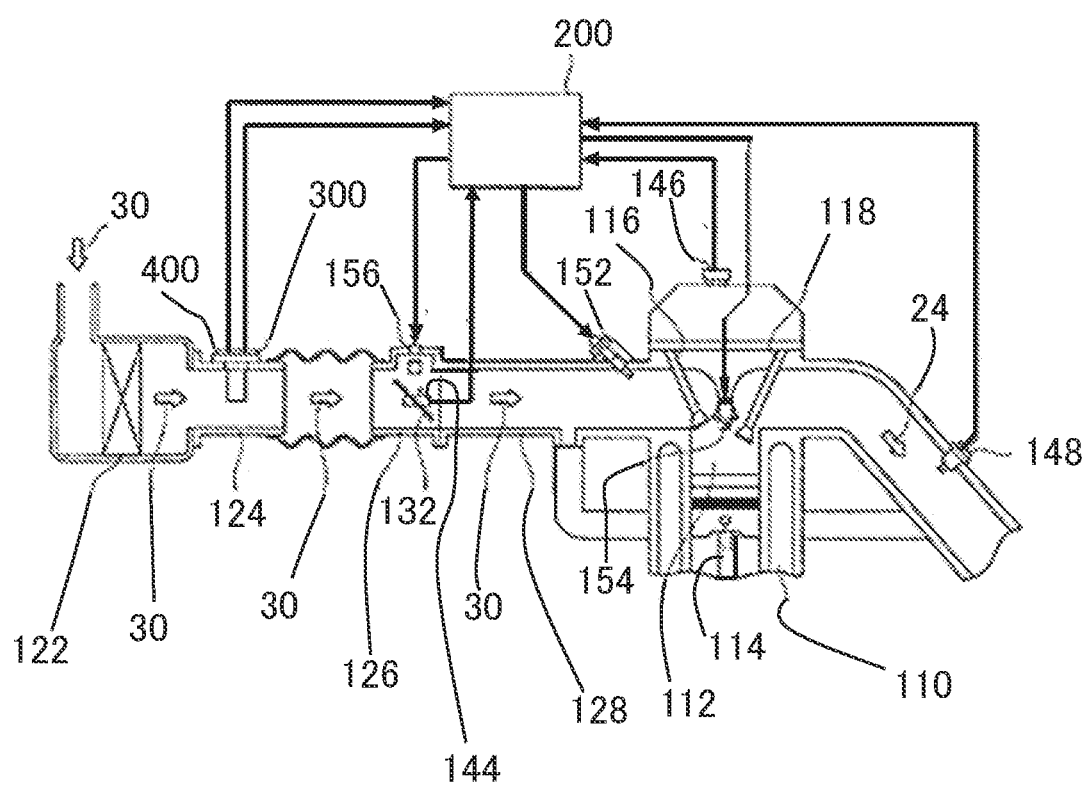
FIG. 1 is a configuration diagram representing the overall configuration of an internal-combustion-engine control system including an internal-combustion-engine control apparatus according to Embodiment 1.

Hereinafter, an internal-combustion-engine control apparatus according to Embodiment 1 will be explained in detail. FIG. 1 is a configuration diagram representing the overall configuration of an internal-combustion-engine control system including an internal-combustion-engine control apparatus according to Embodiment 1. In FIG. 1, an internal combustion engine 110 includes a cylinder 112, a piston 114, an intake valve 116, an exhaust valve 118, and an ignition plug 154.

A control apparatus for controlling the internal combustion engine 110 includes an ECU (Electronic Control Unit) 200 and an intake-air physical quantity measurement apparatus 300 for detecting a flow rate and a temperature of intake air 30, as a fluid to be measured, that is sucked into a main path 124 of the internal combustion engine 110 through an air cleaner 122. The intake-air physical quantity measurement apparatus 300 is configured in such a way that an intake-air flow rate detection device, as an intake-air flow rate detection apparatus for detecting an intake-air flow rate, and an intake-air temperature detection device, as an intake-air temperature detection apparatus for detecting an intake-air temperature, are arranged on one and the same substrate so as to be integrated with each other. Each of the intake-air flow rate detection device and the intake-air temperature detection device is configured with a semiconductor device formed of a thin film having a thickness, for example, in the order of microns.

In addition, the internal-combustion-engine control apparatus includes a throttle opening degree sensor 144 for detecting an opening degree of a throttle valve 132 provided in a throttle body 126, an idle-air control valve 156 provided in the throttle body 126, an fuel injection valve 152 for injecting a fuel into an intake port in an intake manifold 128, a rotation angle sensor 146 for detecting an rotation angle of the internal combustion engine 110, and an oxygen sensor 148 that is provided in an exhaust pipe of the internal combustion engine 110 and detects an amount of oxygen included in an exhaust gas 24.

The intake air 30 travels in the following manner, based on the operation of the internal combustion engine 110. That is to say, the intake air 30 sucked from the outside by an intake system of the internal combustion engine 110 firstly passes through the air cleaner 122 and then is introduced into the combustion chamber in the cylinder 112 of the internal combustion engine 110 through the intake valve 116, by way of the throttle body 126 and the intake manifold 128 provided in the main path 124. The intake-air flow rate and the intake-air temperature, which are physical quantities of the intake air 30, are detected by the foregoing intake-air physical quantity measurement apparatus 300.

The fuel injection valve 152 is provided, for example, in the intake port of the internal combustion engine 110 and injects a fuel into the intake port; the amount of the foregoing fuel is calculated based on the intake-air flow rate and the intake-air temperature, as the physical quantities detected by the intake-air physical quantity measurement apparatus 300. The fuel injected into the intake port is mixed with the intake air 30, which is air, so as to form a fuel-air mixture and then is introduced into the combustion chamber of the internal combustion engine 110 through the intake valve 116. The fuel-air mixture introduced into the combustion chamber is combusted through spark ignition by the ignition plug 154 so as to produce mechanical energy.

The gas combusted in the combustion chamber of the internal combustion engine 110 is introduced into the exhaust pipe through the exhaust valve 118 and then is discharged, as the exhaust gas 24, to the outside of the vehicle. The intake-air flow rate is controlled by the throttle valve 132 whose opening degree changes based on the operation of the accelerator pedal. The fuel supply amount is controlled based on the intake-air flow rate. A driver of the vehicle can control mechanical energy produced by the internal combustion engine 110 by adjusting the opening degree of the throttle valve 132 through the accelerator pedal so as to control the air-fuel ratio of a fuel-air mixture to be introduced into the combustion chamber.

The intake-air physical quantity measurement apparatus 300 inputs an intake-air flow rate detection signal, as an electric signal corresponding to a detected intake-air flow rate, and an intake-air temperature detection signal, as an electric signal corresponding to a detected intake-air temperature, to the ECU 200. The throttle opening degree sensor 144 inputs a throttle opening degree detection signal, as an electric signal corresponding to a detected opening degree of the throttle valve 132, to the ECU 200.

In addition, electric signals corresponding to the respective positions or states of the piston 114, the intake valve 116, and the exhaust valve 118 of the internal combustion engine 110 are inputted to the ECU 200. Moreover, the rotation angle sensor 146 inputs a rotation speed detection signal, as an electric signal corresponding to a rotation speed of the internal combustion engine 110, to the ECU 200. In addition, the oxygen sensor 148 inputs an oxygen amount detection signal, as an electric signal corresponding to an amount of oxygen included in the exhaust gas 24, to the ECU 200. The oxygen amount detection signal is utilized in a calculation of the air-fuel ratio of a mixer.

The ECU 200 calculates a fuel injection amount and an ignition timing, based on the intake-air flow rate detection signal from the intake-air physical quantity measurement apparatus 300 and the rotation speed detection signal from the rotation angle sensor 146; then, based on the results of the calculation, the ECU 200 controls the amount of the fuel supplied through the fuel injection valve 152 and the ignition timing at which the ignition plug 154 ignites the fuel. In practice, the fuel supply amount and the ignition timing are further finely controlled based on the intake-air temperature detection signal from the intake-air physical quantity measurement apparatus 300, the throttle opening degree detection signal from the throttle valve 132, the rotation speed detection signal from the rotation angle sensor 146, and the oxygen amount detection signal from the oxygen sensor 148.

The ECU 200 further controls the rotation speed of the internal combustion engine 110 in an idle driving state, by controlling intake air that bypasses the throttle valve 132, by means of the idle-air control valve 156, while the internal combustion engine 110 is in an idle driving state.

Figure 2:
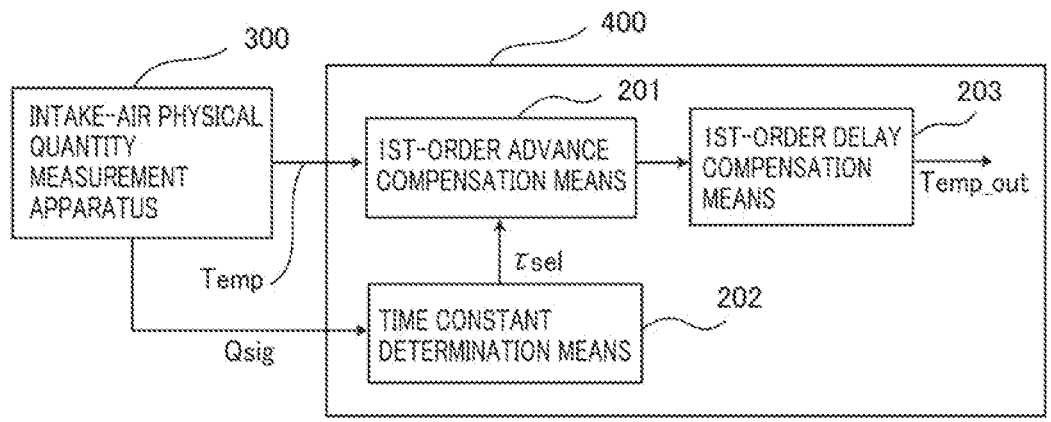
FIG. 2 is a functional configuration diagram representing the configuration of an intake-air-temperature correction control apparatus in the internal-combustion-engine control apparatus according to Embodiment 1.

Next, an intake-air-temperature correction control apparatus that corrects an intake-air temperature will be explained. FIG. 2 is a functional configuration diagram representing the configuration of an intake-air-temperature correction control apparatus in the internal-combustion-engine control apparatus according to Embodiment 1. In FIG. 2, an intake-air-temperature correction control apparatus 400 is configured with programming software stored in a memory of the ECU 200 and is controlled by a microcomputer, as a processor, provided in the ECU 200.

FIG. 9 is a block diagram representing an example of the hardware configuration of an intake-air-temperature correction control apparatus in the internal-combustion-engine control apparatus according to each of Embodiment 1 and after-mentioned Embodiment 2. As represented in FIG. 9, the intake-air-temperature correction control apparatus 400 includes a processor 400P and a storage device 400M. Although not represented, the storage device 400M has a volatile storage device such as a random access memory and a nonvolatile auxiliary storage device such as a flash memory. In addition, instead of the flash memory, an auxiliary storage device such as a hard disk may be included.

The processor 400P executes a program inputted from the storage device 400M. In this case, the program is inputted from the auxiliary storage device to the processor 400P by way of the volatile storage device. Moreover, the processor 400P may output data such as a calculation result either to the volatile storage device of the storage device 400M or to the auxiliary storage device by way of the volatile storage device.

In FIG. 2, the intake-air physical quantity measurement apparatus 300 measures the flow rate and the temperature of the intake air 30 and then inputs the intake-air flow rate detection signal and the intake-air temperature detection signal to the ECU 200. Based on an intake-air flow rate detection signal Qsig from the intake-air physical quantity measurement apparatus 300, a time constant determination means 202 of the intake-air-temperature correction control apparatus 400 in the ECU 200 determines a time constant τsel and then outputs the time constant τsel to a first-order advance compensation means 201. The first-order advance compensation means 201 receives an intake-air temperature detection signal Temp and the time constant τsel from the time constant determination means 202 and corrects a response delay of the intake-air temperature detection signal Temp from a temperature change in the intake air 30.

The output of the first-order advance compensation means 201 is inputted to a first-order delay compensation means 203 in which noise in the output is eliminated; then, the output is outputted, as a corrected intake-air temperature detection signal Temp out, and is utilized as a signal for ignition control and fuel control of the internal combustion engine 110.

Figure 3:
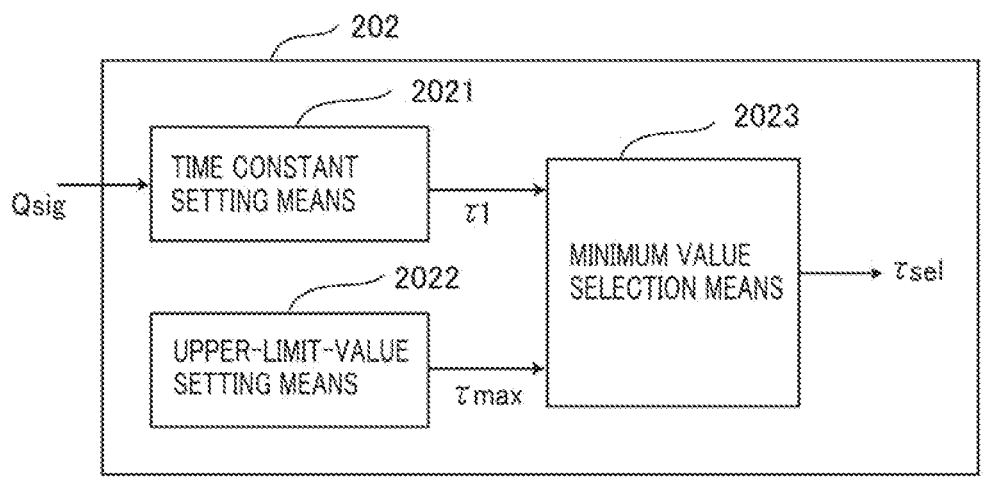
FIG. 3 is a functional configuration diagram representing the configuration of a time constant determination means in the internal-combustion-engine control apparatus according to Embodiment 1.
Figure 4A:
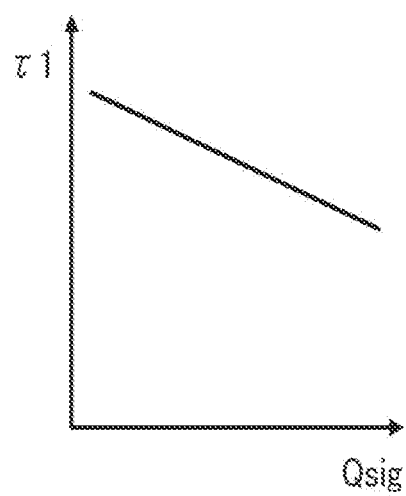
FIG. 4A is an explanatory graph representing a time constant map for the time constant setting means in the internal-combustion-engine control apparatus according to Embodiment 1.
Figure 4B:
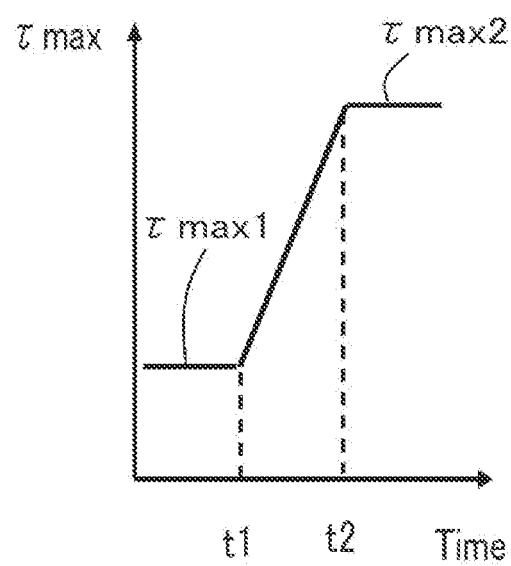
FIG. 4B is an explanatory graph representing an upper limit value map for an upper-limit-value setting means in the internal-combustion-engine control apparatus according to Embodiment 1.

FIG. 3 is a functional configuration diagram representing the configuration of the time constant determination means in the internal-combustion-engine control apparatus according to Embodiment 1. FIG. 4A is an explanatory graph representing a time constant map for the time constant determination means in the internal-combustion-engine control apparatus according to Embodiment 1; the ordinate denotes a time constant τ1, and the abscissa denotes the intake-air flow rate detection signal Qsig. FIG. 4B is an explanatory graph representing an upper limit value map for an upper-limit-value setting means in the internal-combustion-engine control apparatus according to Embodiment 1; the ordinate denotes an upper limit value τmax, and the abscissa denotes the time.

In FIG. 3, a time constant setting means 2021 calculates and sets the time constant τ1, based on data in the time constant map represented in FIG. 4A. An upper-limit-value setting means 2022 calculates and sets the upper limit value τmax of the time constant, based on data in the upper limit value map represented in FIG. 4B.

The time constant τ1 to be set by the time constant setting means 2021 is set based on the intake-air flow rate detection signal Qsig; because being a time constant for improving the responsiveness of the intake-air temperature detection signal Temp, the time constant τ1 becomes smaller in inverse proportion to an increase in the intake-air flow rate detection signal Qsig. Meanwhile, the upper limit value τmax to be set by the upper-limit-value setting means 2022 is set in accordance with the time to be counted after the intake-air physical quantity measurement apparatus 300 has been supplied with a power source, and becomes the upper limit value of the time constant τsel to be outputted from the time constant determination means 202.

The upper limit value τmax of the time constant in the time constant map represented in FIG. 4B is for suppressing excessive correction from being applied to the intake-air temperature detection signal due to a temperature increase in a built-in heater at a time when the intake-air physical quantity measurement apparatus 300 is supplied with the power source. Accordingly, in a time period from a time when the intake-air physical quantity measurement apparatus 300 is supplied with the power source to a predetermined time point t1, the upper limit value τmax1 of the time constant τsel is set. After and including a time point t2 till which a predetermined time elapses from a time point when the intake-air physical quantity measurement apparatus 300 has been supplied with the power source, the intake-air temperature detection signal Temp stabilizes and hence it is not required to limit the time constant τsel; therefore, as the upper limit value, an upper limit value τmax2, which is an ineffective value as the upper limit value, is set.

As represented in FIG. 4B, the upper limit value τmax is set to either the upper limit value τmax1 or the upper limit value τmax2, which is ineffective as the upper limit value; however, in order to prevent a sudden change in the time constant from causing excessive correction, the upper limit value τmax is set in such a way as to continuously change between the time point t1 and the time point t2. It is only necessary to set the upper limit value τmax1, the time point t1, and the time point t2 to respective values obtained based on an experiment.

A minimum value selection means 2023 represented in FIG. 3 receives the time constant τ1, which is the output of the time constant setting means 2021, and the upper limit value τmax, which is the output of the upper-limit-value setting means 2022, and then outputs the minimum value of these values, as the time constant τsel.

In the case where the intake-air temperature detection device in the intake-air physical quantity measurement apparatus 300 is disposed in the measurement path or the circuit containing portion having a large heat capacity, detection of a temperature change by the intake-air temperature detection device is delayed from a temperature change in the intake air 30 flowing in the main path 124. Accordingly, in order to improve the delay in the detection of the intake-air temperature by the intake-air temperature detection device, the first-order advance compensation means 201 is provided. However, a temperature change based on a temperature increase of the heater, which is caused when the intake-air physical quantity measurement apparatus 300 is supplied with the power source, is faster than a change in the intake-air temperature; thus, when first-order advance compensation is implemented by use of the time constant $\tau 1$ to be set by the time constant setting means 2021 represented in FIG. 3, the intake-air temperature detection signal Temp is excessively corrected.

Therefore, until a predetermined time elapses after the intake-air physical quantity measurement apparatus 300 is supplied with the power source, the time constant to be set by the time constant setting means 2021 in the time constant determination means 202 is limited to the upper limit value $\tau max1$. When as described above, the time constant to be set by the time constant setting means 2021 is limited to the upper limit value $\tau max1$, it is made possible to suppress excessive correction by the first-order advance compensation means that is caused at a time when the intake-air physical quantity measurement apparatus 300 is supplied with the power source.

For example, until a predetermined time elapses after the ECU 200 has supplied the power source to the intake-air physical quantity measurement apparatus 300, the minimum value selection means 2023 selects the upper limit value $\tau max1$ set by the upper-limit-value setting means 2022 and outputs the selected upper limit value $\tau max1$. Because even when the intake-air temperature detection device in the intake-air physical quantity measurement apparatus 300 detects a temperature change based on a temperature increase of the heater, which is faster than a temperature change in the intake air 30, the first-order advance compensation means 201 receives the time constant limited to the upper limit value $\tau max1$ so as to calculate a first-order advance compensation value, excessive correction caused when the heater temperature increases can be suppressed.

In addition, the temperature increase in the intake-air physical quantity measurement apparatus 300, caused by the heater, is largest at a time immediately after the intake-air physical quantity measurement apparatus 300 is supplied with the power source; thus, as described above, the upper limit value $\tau max$ of the time constant is changed from the upper limit value $\tau max1$ to the upper limit value $\tau max1$ in accordance with the time elapsed after the intake-air physical quantity measurement apparatus 300 is supplied with the power source. When a predetermined time elapses after the intake-air physical quantity measurement apparatus 300 has been supplied with the power source and then the heater temperature reaches a constant temperature, the effect of a temperature increase by the heater is reduced; thus, setting the upper limit value of the time constant to the upper limit value $\tau max2$, which is ineffective, as the upper limit value, makes it possible that the first-order advance compensation value is calculated based on the time constant $\tau 1$ for improving the response delay of the intake-air temperature detection signal Temp and that the temperature of the intake air 30 is accurately calculated.

Figure 5:
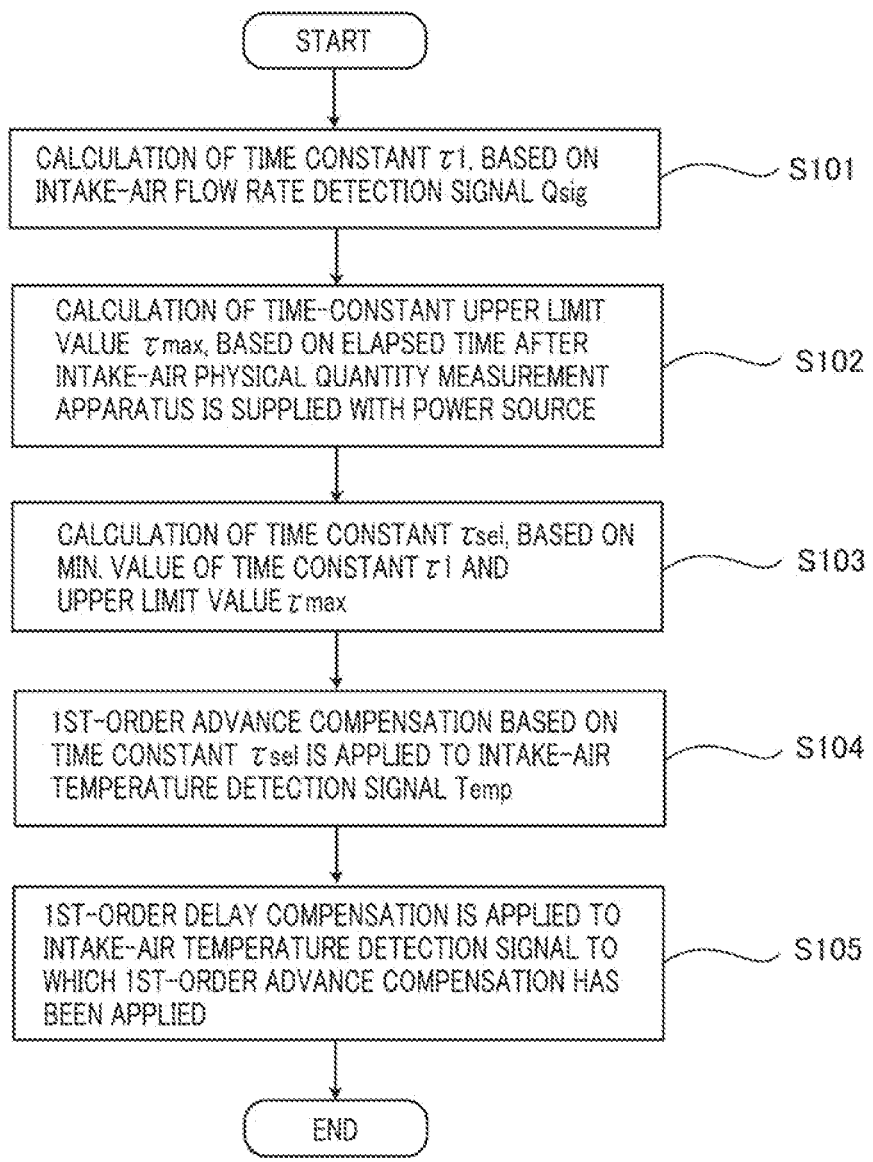
FIG. 5 is a flowchart representing the operation of the intake-air-temperature correction control apparatus in the internal-combustion-engine control apparatus according to Embodiment 1.

Next, the operation of the intake-air-temperature correction control apparatus 400 will be explained. FIG. 5 is a flowchart representing the operation of the intake-air-temperature correction control apparatus in the internal-combustion-engine control apparatus according to Embodiment 1. In FIG. 5, in the step S101, the intake-air flow rate detection signal Qsig is inputted to the time constant setting means 2021 in the time constant determination means 202, and then the time constant setting means 2021 calculates the time constant $\tau 1$ for applying the first-order advance compensation to the intake-air temperature detection signal. In this situation, from the time constant map represented in FIG. 4A, the time constant setting means 2021 calculates and sets the time constant $\tau 1$, based on the intake-air flow rate detection signal Qsig.

Next, in the step S102, the upper-limit-value setting means 2022 calculates the upper limit value $\tau max$ of the time constant $\tau 1$ calculated in the step S101, based on the elapsed time from a time point when power supply for the intake-air physical quantity measurement apparatus 300 has been started. In this situation, from the upper limit value map represented in FIG. 4B, the upper-limit-value setting means 2022 calculates the upper limit value $\tau max$, based on the elapsed time from a time point when power supply for the heater incorporated in the intake-air physical quantity measurement apparatus 300 has been started. Because the intake-air physical quantity measurement apparatus 300 is supplied with the power source by the ECU 200, it is only necessary that the ECU 200 measures the elapsed time from the start of the power supply.

In the step S103, the time constant $\tau 1$ calculated in the step S101 and the upper limit value $\tau max$ calculated in the step S102 are inputted to the minimum value selection means 2023. The minimum value selection means 2023 compares the inputted time constant $\tau 1$ with the inputted upper limit value $\tau max$, selects the minimum value out of them, and then outputs the minimum value, as the time constant $\tau sel$.

Next, in the step S104, the intake-air temperature detection signal Temp, which is the output of the intake-air physical quantity measurement apparatus 300, and the time constant $\tau sel$, which is the output of the time constant determination means 202, are inputted to the first-order advance compensation means 201 so that advance compensation is applied to the intake-air temperature detection signal Temp.

In the step S105, the intake-air temperature detection signal to which advance compensation has been applied in the step S104 is inputted to the first-order delay compensation means 203 so that in order to eliminate noise, delay compensation is applied to the intake-air temperature detection signal to which advance compensation has been applied; then, the processing is ended. The signal obtained by applying delay compensation to the intake-air temperature detection signal to which advance compensation has been applied is outputted from the first-order delay compensation means 203, as a corrected intake-air temperature detection signal Temp out to be outputted from the intake-air-temperature correction control apparatus 400.

As described above, the time constant determination means 202 can suppress excessive correction of the intake-air temperature that is caused when the intake-air physical quantity measurement apparatus 300 is supplied with the power source, by comparing the output of the time constant setting means 2021 with the output of the upper-limit-value setting means 2022 and then by selecting and outputting the minimum value out of them.

FIG. 10 is an explanatory graph for a conventional apparatus as a comparative example. As represented in FIG. 10, in the case of the conventional apparatus as a comparative example, as indicated by P in (A) of FIG. 10, when the intake-air physical quantity measurement apparatus is supplied with a power source, the intake-air flow rate detection device is heated by the heater incorporated in the intake-air physical quantity measurement apparatus; therefore, the temperature of the intake-air temperature detection device also rises as indicated by E1 and hence the intake-air temperature detection signal, represented in (B) of FIG. 10, from the intake-air temperature detection device suddenly rises. Accordingly, when the first-order advance compensation is applied to the intake-air temperature detection signal, sudden-change excessive correction E2 is caused.

In the internal-combustion-engine control apparatus according to Embodiment 1 of the present disclosure, the foregoing configuration makes it possible to suppress such excessive correction of the intake-air temperature detection signal, caused in the conventional apparatus.

Embodiment 2

Figure 6:
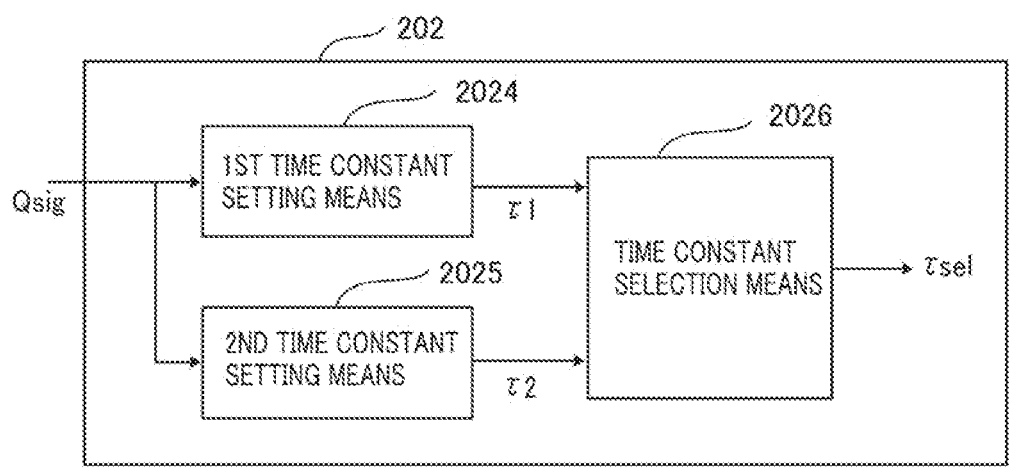
FIG. 6 is a functional configuration diagram representing the configuration of a time constant determination means in an internal-combustion-engine control apparatus according to Embodiment 2.

Next, an internal-combustion-engine control apparatus according to Embodiment 2 will be explained. In the following explanation, the portion thereof different from those of the internal-combustion-engine control apparatus according to Embodiment 1 will mainly be explained. FIG. 6 is a functional configuration diagram representing the configuration of a time constant determination means in the internal-combustion-engine control apparatus according to Embodiment 2.

In Embodiment 1, the upper-limit-value setting means 2022 sets the upper limit value $\tau max$ of the time constant; however, when the intake-air flow rate changes concurrently with the power-source supply to the intake-air physical quantity measurement apparatus 300, the first-order advance compensation corresponding to the intake-air flow rate cannot be implemented because the upper limit value is a constant value; thus, the accuracy of the temperature compensation value may be deteriorated. Embodiment 2 solves the foregoing deterioration in the accuracy of the temperature compensation value.

In FIG. 6, the time constant determination means 202 has a first time constant determination means 2024, a second time constant determination means 2025, and a time constant selection means 2026. The time constant selection means 2026 is configured in such a way as to select one of a first time constant $\tau 1$ set by the first time constant determination means 2024 and a second time constant $\tau 2$ set by the second time constant determination means 2025 and then output the selected time constant, as the time constant $\tau sel$.

Figure 7A:
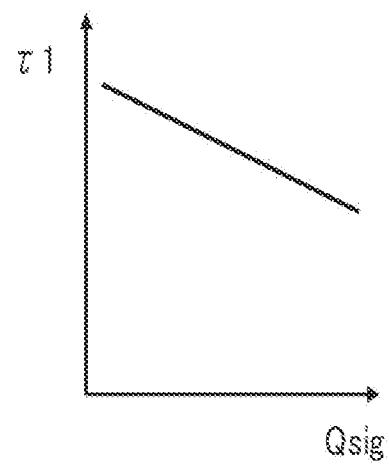
FIG. 7A is an explanatory graph representing a time constant map for a first time constant setting means in the internal-combustion-engine control apparatus according to Embodiment 2.
Figure 7B:
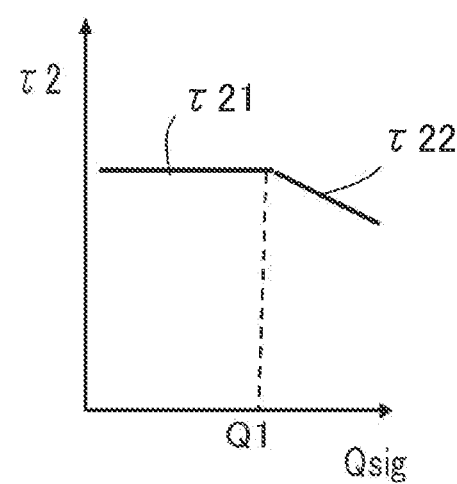
FIG. 7B is an explanatory graph representing a time constant map for a second time constant setting means in the internal-combustion-engine control apparatus according to Embodiment 2.

FIG. 7A is an explanatory graph representing a time constant map for the first time constant setting means in the internal-combustion-engine control apparatus according to Embodiment 2; FIG. 7B is an explanatory graph representing a time constant map for the second time constant setting means in the internal-combustion-engine control apparatus according to Embodiment 2. As represented in FIG. 7A, based on the intake-air flow rate detection signal Qsig indicating the flow rate of the intake air 30, the first time constant determination means 2024 sets the first time constant $\tau 1$ for improving the responsiveness of the intake-air temperature detection signal Temp. The time constant $\tau 1$ changes in inverse proportion to a change in the intake-air flow rate detection signal Qsig.

As represented in FIG. 7B, the second time constant determination means 2025 sets the second time constant $\tau 2$ for suppressing excessive correction of the intake-air temperature detection signal due to temperature increase in the heater of the intake-air physical quantity measurement apparatus 300, in accordance with the intake-air flow rate detection signal Qsig. The second time constant $\tau 2$ is a value obtained in consideration of the excessive correction caused by a temperature increase in the heater of the intake-air physical quantity measurement apparatus 300 and is a time constant smaller than the first time constant $\tau 1$. The second time constant $\tau 2$ is a fixed second time constant $\tau 21$ until the intake-air flow rate detection signal Qsig reaches a predetermined value Q1; after the intake-air flow rate detection signal Qsig reaches the predetermined value Q1, the second time constant $\tau 2$ decreases in inverse proportion to an increase in the intake-air flow rate detection signal Qsig, as indicated by the time constant $\tau 22$.

Figure 8:
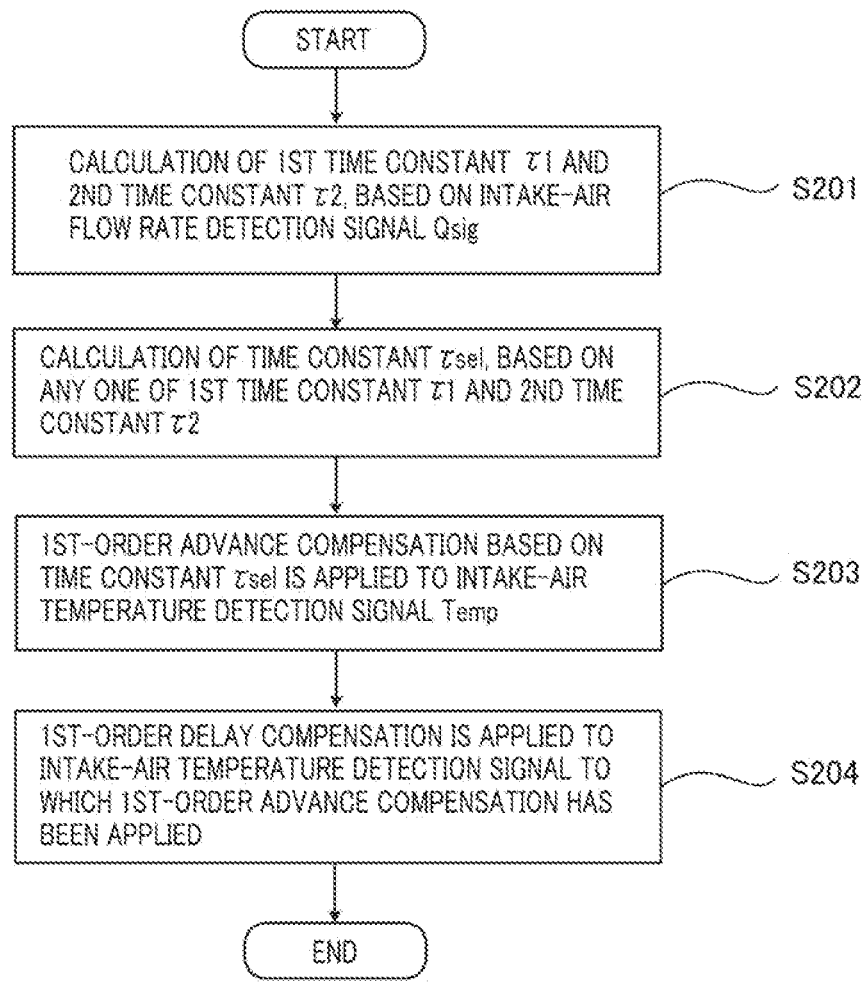
FIG. 8 is a flowchart representing the operation of an intake-air-temperature correction control apparatus in the internal-combustion-engine control apparatus according to Embodiment 2.

FIG. 8 is a flowchart representing the operation of an intake-air-temperature correction control apparatus in the internal-combustion-engine control apparatus according to Embodiment 2. In FIG. 8, in the step S201, the first time constant determination means 2024 of the time constant determination means 202 receives the intake-air flow rate detection signal Qsig and then calculates the first time constant $\tau 1$, based on the time constant map represented in FIG. 7A. In addition, the second time constant determination means 2025 of the time constant determination means 202 receives the intake-air flow rate detection signal Qsig and then calculates the second time constant $\tau 2$, based on the time constant map represented in FIG. 7B.

In the step S202, the time constant selection means 2026 receives the first time constant $\tau 1$ and the second time constant $\tau 2$ and then calculates the time constant $\tau sel$. In the case where a predetermined time has not elapsed from the start of power-source supply to the intake-air physical quantity measurement apparatus 300, the time constant selection means 2026 selects the second time constant $\tau 2$; in the case where the predetermined time has elapsed from the start of power-source supply to the intake-air physical quantity measurement apparatus 300, the time constant selection means 2026 selects the first time constant $\tau 1$.

When the second time constant $\tau 2$ is switched to the first time constant $\tau 1$, excessive correction may be caused depending on the setting difference between the time constants; therefore, after any one of the first time constant $\tau 1$ and the second time constant $\tau 2$ is selected, the selected time constant is made to pass through a filter so as to change continuously, so that the corrected intake-air temperature detection signal Temp out is prevented from suddenly changing due to switching of the time constants.

Next, in the step S203, the intake-air temperature detection signal Temp, which is the output of intake-air physical quantity measurement apparatus 300, and the time constant $\tau sel$, which is the output of the time constant determination means 202, are inputted to the first-order advance compensation means 201 so that first-order advance compensation is applied to the intake-air temperature detection signal Temp.

In the step S204, the first-order delay compensation means 203 receives and then applies first-order delay compensation to the intake-air temperature detection signal to which the first-order advance compensation has been applied, so that noise is eliminated therefrom. The signal obtained by applying delay compensation to the intake-air temperature detection signal to which advance compensation has been applied is outputted from the first-order delay compensation means 203, as a corrected intake-air temperature detection signal Temp out to be outputted from the intake-air-temperature correction control apparatus 400.

As described above, the respective time constants for the first-order advance compensation based on the intake-air flow rate detection signal Qsig are set by the first time constant determination means 2024 and the second time constant determination means 2025, and then the time constants are switched from each other, based on the elapsed time from the start of power-source supply to the intake-air physical quantity measurement apparatus 300; as a result, it is made possible to suppress excessive correction, of the intake-air temperature detection signal, that is caused when the intake-air physical quantity measurement apparatus 300 is supplied with the power source.

Moreover, the second time constant determination means 2025 can set the second time constant τ2, based on the intake-air flow rate detection signal Qsig; thus, even when the flow rate changes concurrently with the start of the power-source supply to the intake-air physical quantity measurement apparatus 300, a high-accuracy intake air temperature can be calculated.

In addition, in each of Embodiment 1 and Embodiment 2, the intake-air flow rate detection signal and the intake-air temperature detection signal to be measured by the intake-air physical quantity measurement apparatus 300 may be inputted, as analogue voltages, to the ECU 200; alternatively, the foregoing signals may be inputted, as communication signals, to the ECU 200 though CAN (Controller Area Network), SENT (Single Edge Nibble Transmission), or LIN (Local Interconnect Network).

As described above, it is made possible to improve a response delay in the intake-air temperature measured by the intake-air physical quantity measurement apparatus 300 and to suppress excessive correction by the first-order advance compensation from being implemented due to an increase in the temperature of the heater at a time when power-source supply to the intake-air physical quantity measurement apparatus 300 is started.

In each of Embodiment 1 and Embodiment 2, the ECU 200 controls the intake-air-temperature correction control apparatus 400 so as to suppress excessive correction by the first-order advance compensation; however, in the case where when the intake-air physical quantity measurement apparatus 300 is provided with a microcomputer or an LSI (Large Scale Integration) circuit corresponding to a microcomputer, the microcomputer or the LSI provided in the intake-air physical quantity measurement apparatus 300 controls the intake-air-temperature correction control apparatus 400 so as to suppress excessive correction by the first-order advance compensation, there can be obtained a result the same as that at a time when the ECU 200 performs the correction.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

Next, the respective features of the internal-combustion-engine control apparatuses disclosed in the present disclosure will be described as appendixes.

(Appendix 1) An internal-combustion-engine control apparatus comprising:
an intake-air physical quantity measurement apparatus having
an intake-air flow rate detection apparatus that detects a flow rate of intake air to be sucked into an internal combustion engine and then outputs an intake-air flow rate detection signal, and
an intake-air temperature detection apparatus that detects a temperature of the intake air and then outputs an intake-air temperature detection signal; and
an intake-air-temperature correction control apparatus having
a first-order advance compensation means that applies advance compensation to the intake-air temperature detection signal by use of the intake-air temperature detection signal,
a time constant determination means that calculates a time constant for performing the advance compensation and then input the time constant to the first-order advance compensation means, and
a first-order delay compensation means that applies delay compensation to a calculation value of the first-order advance compensation means, and outputting an output of the first-order delay compensation means, as a corrected intake-air temperature detection signal,
wherein the time constant determination means has
a time constant setting means that sets the time constant, based on the intake-air flow rate detection signal,
an upper-limit-value setting means that sets an upper limit value of the time constant, and
a minimum value selection means that selects and outputs a minimum value of a time constant set by the time constant setting means and the upper limit value set by the upper-limit-value setting means, and
wherein the first-order advance compensation means applies advance compensation to the intake-air temperature detection signal, based on the output of the minimum value selection means, and controls the internal combustion engine by use of the corrected intake-air temperature detection signal to be outputted from the intake-air-temperature correction control apparatus.

(Appendix 2) The internal-combustion-engine control apparatus according to Appendix 1, wherein until a predetermined time elapses after a power source is supplied to the intake-air physical quantity measurement apparatus, the upper-limit-value setting means keeps the upper limit value constant.

(Appendix 3) An internal-combustion-engine control apparatus comprising:
an intake-air physical quantity measurement apparatus having
an intake-air flow rate detection apparatus that detects a flow rate of intake air to be sucked into an internal combustion engine and then outputs an intake-air flow rate detection signal, and an intake-air temperature detection apparatus that detects a temperature of the intake air and then outputs an intake-air temperature detection signal; and an intake-air-temperature correction control apparatus having a first-order advance compensation means that applies advance compensation to the intake-air temperature detection signal by use of the intake-air temperature detection signal, a time constant determination means that calculates a time constant for performing the advance compensation and then input the time constant to the first-order advance compensation means, and a first-order delay compensation means that applies delay compensation to a calculation value of the first-order advance compensation means, and outputting an output of the first-order delay compensation means, as a corrected intake-air temperature detection signal, wherein the time constant determination means has a first time constant setting means that sets a first time constant, based on the intake-air flow rate detection signal, a second time constant setting means that sets a second time constant, based on the intake-air flow rate detection signal, and a time constant selection means that selects any one of the first time constant set by the first time constant setting means and the second time constant set by the second time constant setting means, and wherein the first-order advance compensation means applies advance compensation to the intake-air temperature detection signal, based on said any one of said time constants, selected by the time constant selection means, and controls the internal combustion engine by use of the corrected intake-air temperature detection signal to be outputted from the intake-air-temperature correction control apparatus.

(Appendix 4) The internal-combustion-engine control apparatus according to Appendix 3, wherein the second time constant is set to be smaller than the first time constant, and wherein in the case where a predetermined time has not elapsed after a power source has been supplied to the intake-air physical quantity measurement apparatus, the time constant selection means selects the second time constant; in the case where the predetermined time has elapsed, the time constant selection means selects the first time constant.

(Appendix 5) The internal-combustion-engine control apparatus according to any one of Appendixes 1 through 4, wherein the intake-air-temperature correction control apparatus is controlled by an ECU for controlling the internal combustion engine.

(Appendix 6) The internal-combustion-engine control apparatus according to any one of Appendixes 1 through 4, wherein the intake-air-temperature correction control apparatus is controlled by a microcomputer or an LSI mounted in the intake-air physical quantity measurement apparatus.

(Appendix 7) The internal-combustion-engine control apparatus according to any one of Appendixes 1 through 6, wherein the intake-air flow rate detection apparatus and the intake-air temperature detection apparatus are mounted on one and the same substrate so as to be integrated with each other, and wherein the intake-air flow rate detection apparatus is heated by a heater to be energized through supply of a power source to the intake-air physical quantity measurement apparatus and detects a flow rate of the intake air, based on an electric quantity supplied to the heater.

What is claimed is:

1. An internal-combustion-engine control apparatus comprising:

an intake-air physical quantity measurement apparatus having a hot-film mass flow sensor that detects a flow rate of intake air to be sucked into an internal combustion engine and then outputs an intake-air flow rate detection signal, and a thin-film temperature sensor that detects a temperature of the intake air and then outputs an intake-air temperature detection signal; and a first-order advance compensator that applies advance compensation to the intake-air temperature detection signal by use of the intake-air temperature detection signal, an intake-air-temperature correction control apparatus having a memory storing instructions; and at least one hardware processor configured to execute the instructions to implement:

calculating a time constant for performing the advance compensation and then inputting the time constant to the first-order advance compensator, applying delay compensation to a calculation value of the first-order advance compensator, and outputting an output as a corrected intake-air temperature detection signal, setting a first time constant, based on the intake-air flow rate detection signal, setting a second time constant, based on the intake-air flow rate detection signal, and selecting any one of the first time constant and the second time constant, and wherein the first-order advance compensator applies advance compensation to the intake-air temperature detection signal, based on said selected time constant, and controls the internal combustion engine by use of the corrected intake-air temperature detection signal.

2. The internal-combustion-engine control apparatus according to claim 1, wherein the second time constant is set to be smaller than the first time constant, and wherein in the case where a predetermined time has not elapsed after a power source has been supplied to the intake-air physical quantity measurement apparatus, the intake-air-temperature correction control apparatus selects the second time constant; in the case where the predetermined time has elapsed, the intake-air-temperature correction control apparatus selects the first time constant.

3. The internal-combustion-engine control apparatus according to claim 2, wherein the intake-air-temperature correction control apparatus is controlled by an ECU for controlling the internal combustion engine.

4. The internal-combustion-engine control apparatus according to claim 2, wherein the intake-air-temperature correction control apparatus is controlled by a microcomputer or an LSI mounted in the intake-air physical quantity measurement apparatus.

5. The internal-combustion-engine control apparatus according to claim 2,
wherein the hot-film mass flow sensor and the thin-film temperature sensor are mounted on one and the same substrate so as to be integrated with each other, and
wherein the hot-film mass flow sensor is heated by a heater to be energized through supply of the power source to the intake-air physical quantity measurement apparatus and detects a flow rate of the intake air, based on an electric quantity supplied to the heater.

6. The internal-combustion-engine control apparatus according to claim 1, wherein the intake-air-temperature correction control apparatus is controlled by an ECU for controlling the internal combustion engine.

7. The internal-combustion-engine control apparatus according to claim 1, wherein the intake-air-temperature correction control apparatus is controlled by a microcomputer or an LSI mounted in the intake-air physical quantity measurement apparatus.

8. The internal-combustion-engine control apparatus according to claim 1,
wherein the hot-film mass flow sensor and the thin-film temperature sensor are mounted on one and the same substrate so as to be integrated with each other, and
wherein the hot-film mass flow sensor is heated by a heater to be energized through supply of a power source to the intake-air physical quantity measurement apparatus and detects a flow rate of the intake air, based on an electric quantity supplied to the heater.

\* \* \* \* \*